(12) United States Patent
Smyth et al.

(10) Patent No.: US 11,686,887 B1
(45) Date of Patent: Jun. 27, 2023

(54) OPTICAL LENS ASSEMBLIES AND RELATED METHODS

(71) Applicant: META PLATFORMS TECHNOLOGIES, LLC, Menlo Park, CA (US)

(72) Inventors: Katherine Marie Smyth, Seattle, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 173 days.

(21) Appl. No.: 17/160,169

(22) Filed: Jan. 27, 2021

Related U.S. Application Data

(63) Continuation of application No. 16/018,746, filed on Jun. 26, 2018, now Pat. No. 10,914,871.

(Continued)

(51) Int. Cl.
| | |
|---|---|
| G02C 7/02 | (2006.01) |
| G02B 3/14 | (2006.01) |
| G02C 7/06 | (2006.01) |
| G02B 27/01 | (2006.01) |
| G02B 26/06 | (2006.01) |
| G02B 3/12 | (2006.01) |
| G02F 1/1362 | (2006.01) |
| G02B 26/08 | (2006.01) |

(52) U.S. Cl.
CPC ............... *G02B 3/14* (2013.01); *G02B 3/12* (2013.01); *G02B 26/06* (2013.01); *G02B 26/0875* (2013.01); *G02B 27/017* (2013.01); *G02B 27/0172* (2013.01); *G02C 7/06* (2013.01); *G02F 1/136277* (2013.01); *G02B 2027/011* (2013.01); *G02B 2027/0107* (2013.01); *G02B 2027/0178* (2013.01)

(58) Field of Classification Search
None
See application file for complete search history.

(56) References Cited

U.S. PATENT DOCUMENTS

| 60,109 A | 11/1866 | Woodward |
|---|---|---|
| 3,571,555 A | 3/1971 | Townes et al. |

(Continued)

FOREIGN PATENT DOCUMENTS

| KR | 10-2011-0107812 A | 10/2011 |
|---|---|---|
| KR | 101675093 B1 | 11/2016 |

(Continued)

OTHER PUBLICATIONS

John M. Cooke, et al.; Optical Lens Assemblies, Head-Mounted Displays, And Related Methods; U.S. Appl. No. 16/021,580, filed Jun. 28, 2018.

(Continued)

*Primary Examiner* — Darryl J Collins
(74) *Attorney, Agent, or Firm* — Greenberg Traurig, LLP

(57) ABSTRACT

The disclosed optical lens assemblies may include a pre-strained deformable element that exhibits a non-uniform mechanical strain or stress profile, a structural support element coupled to the pre-strained deformable element, and a deformable medium positioned between the pre-strained deformable element and the structural support element. Related head-mounted displays and methods of fabricating such optical lens assemblies are also disclosed.

19 Claims, 8 Drawing Sheets

Related U.S. Application Data

(60) Provisional application No. 62/650,254, filed on Mar. 29, 2018.

(56) References Cited

U.S. PATENT DOCUMENTS

| | | | |
|---|---|---|---|
| 3,797,922 A | 3/1974 | Plummer | |
| 4,477,158 A | 10/1984 | Pollock et al. | |
| 5,154,862 A | 10/1992 | Reagan et al. | |
| 5,225,244 A | 7/1993 | Aharoni et al. | |
| 5,663,779 A | 9/1997 | Karasawa | |
| 5,956,183 A | 9/1999 | Epstein et al. | |
| 6,081,388 A | 6/2000 | Widl | |
| 6,420,441 B1 | 7/2002 | Allen et al. | |
| 6,918,670 B2 * | 7/2005 | Blum | G02B 7/28 351/159.41 |
| 7,008,054 B1 | 3/2006 | Kurtin et al. | |
| 7,118,219 B2 | 10/2006 | Itagaki | |
| 7,125,508 B2 | 10/2006 | Ide et al. | |
| 7,864,440 B2 | 1/2011 | Berge | |
| 7,866,816 B2 | 1/2011 | Kurtin | |
| 8,210,678 B1 | 7/2012 | Farwig | |
| 8,441,737 B2 | 5/2013 | Buch et al. | |
| 9,292,085 B2 | 3/2016 | Bennett et al. | |
| 10,187,568 B1 | 1/2019 | Tran et al. | |
| 10,409,089 B2 | 9/2019 | Pugh et al. | |
| 10,698,224 B1 | 6/2020 | Cooke et al. | |
| 10,754,145 B1 | 8/2020 | Ouderkirk et al. | |
| 10,881,287 B1 | 1/2021 | Ouderkirk et al. | |
| 10,928,558 B1 | 2/2021 | Cooke et al. | |
| 10,928,656 B1 | 2/2021 | Smyth et al. | |
| 10,962,791 B1 | 3/2021 | Ouderkirk et al. | |
| 11,011,739 B1 | 5/2021 | Ouderkirk et al. | |
| 11,048,075 B1 | 6/2021 | Ouderkirk et al. | |
| 2003/0003295 A1 | 1/2003 | Dreher et al. | |
| 2003/0054115 A1 | 3/2003 | Albano et al. | |
| 2003/0067245 A1 | 4/2003 | Pelrine et al. | |
| 2003/0083433 A1 | 5/2003 | James et al. | |
| 2003/0128496 A1 | 7/2003 | Allen et al. | |
| 2004/0096672 A1 | 5/2004 | Lukas et al. | |
| 2006/0024976 A1 | 2/2006 | Waldfried et al. | |
| 2006/0073424 A1 | 4/2006 | Koveshnikov et al. | |
| 2006/0228092 A1 | 10/2006 | Hebrink et al. | |
| 2006/0247404 A1 | 11/2006 | Todd | |
| 2007/0035839 A1 | 2/2007 | Ibuki | |
| 2008/0038561 A1 | 2/2008 | Yoshizawa et al. | |
| 2008/0049431 A1 | 2/2008 | Boek et al. | |
| 2008/0084532 A1 | 4/2008 | Kurtin | |
| 2008/0088793 A1 | 4/2008 | Sverdrup et al. | |
| 2008/0123049 A1 | 5/2008 | Volk | |
| 2008/0144185 A1 | 6/2008 | Wang et al. | |
| 2008/0170299 A1 | 7/2008 | Kawabata | |
| 2008/0171431 A1 | 7/2008 | Yu et al. | |
| 2008/0290435 A1 | 11/2008 | Oliver et al. | |
| 2008/0291394 A1 | 11/2008 | Ishak | |
| 2009/0015786 A1 | 1/2009 | Harris | |
| 2009/0027778 A1 | 1/2009 | Wu et al. | |
| 2009/0096106 A1 | 4/2009 | Vrtis et al. | |
| 2009/0289529 A1 | 11/2009 | Ito et al. | |
| 2009/0304924 A1 | 12/2009 | Gadgil | |
| 2010/0075056 A1 | 3/2010 | Axisa et al. | |
| 2010/0109486 A1 | 5/2010 | Polyakov et al. | |
| 2010/0168409 A1 | 7/2010 | Fujita | |
| 2010/0202054 A1 | 8/2010 | Niederer | |
| 2010/0238400 A1 | 9/2010 | Volk | |
| 2011/0075096 A1 | 3/2011 | Ishak et al. | |
| 2011/0085131 A1 | 4/2011 | Gupta et al. | |
| 2011/0096411 A1 | 4/2011 | Henriksen et al. | |
| 2011/0149410 A1 | 6/2011 | Blum | |
| 2011/0176105 A1 | 7/2011 | Harris | |
| 2011/0179861 A1 | 7/2011 | Grange et al. | |
| 2011/0235326 A1 | 9/2011 | Yeh et al. | |
| 2011/0294305 A1 | 12/2011 | Jacobs et al. | |
| 2012/0029416 A1 | 2/2012 | Parker et al. | |
| 2012/0032559 A1 | 2/2012 | Hino et al. | |
| 2012/0041553 A1 | 2/2012 | Gupta et al. | |
| 2012/0044571 A1 | 2/2012 | Mukawa | |
| 2012/0063000 A1 | 3/2012 | Batchko et al. | |
| 2012/0087015 A1 | 4/2012 | Nibauer et al. | |
| 2012/0092775 A1 | 4/2012 | Duston et al. | |
| 2012/0170920 A1 | 7/2012 | Moreau et al. | |
| 2012/0229754 A1 | 9/2012 | Iyer et al. | |
| 2012/0250151 A1 | 10/2012 | Lee et al. | |
| 2012/0287512 A1 | 11/2012 | Egan et al. | |
| 2013/0171546 A1 | 7/2013 | White et al. | |
| 2013/0176628 A1 | 7/2013 | Batchko et al. | |
| 2013/0300635 A1 | 11/2013 | White et al. | |
| 2014/0009039 A1 | 1/2014 | Jenninger et al. | |
| 2014/0078586 A1 | 3/2014 | Spurgeon et al. | |
| 2014/0153102 A1 | 6/2014 | Chang | |
| 2014/0186215 A1 | 7/2014 | Shinta et al. | |
| 2014/0227548 A1 | 8/2014 | Myrick | |
| 2014/0300857 A1 | 10/2014 | Cohen-Tannoudji et al. | |
| 2014/0312737 A1 | 10/2014 | Jenninger et al. | |
| 2015/0062719 A1 | 3/2015 | Kyung et al. | |
| 2015/0116656 A1 | 4/2015 | Stevens et al. | |
| 2015/0138110 A1 | 5/2015 | Yairi et al. | |
| 2015/0146161 A1 | 5/2015 | Rigato et al. | |
| 2015/0302990 A1 | 10/2015 | Ghosh et al. | |
| 2015/0323812 A1 | 11/2015 | Ishak et al. | |
| 2016/0004099 A1 | 1/2016 | Steven et al. | |
| 2016/0091635 A1 | 3/2016 | Ibuki et al. | |
| 2016/0187985 A1 | 6/2016 | Lim et al. | |
| 2017/0021385 A1 | 1/2017 | Smith et al. | |
| 2017/0045649 A1 | 2/2017 | Bolis | |
| 2017/0160600 A1 | 6/2017 | Galstian et al. | |
| 2017/0177106 A1 | 6/2017 | Kihara | |
| 2017/0184848 A1 | 6/2017 | Vallius | |
| 2017/0188021 A1 | 6/2017 | Lo et al. | |
| 2017/0192595 A1 | 7/2017 | Choi et al. | |
| 2017/0261653 A1 | 9/2017 | Peyman | |
| 2017/0299956 A1 | 10/2017 | Holland et al. | |
| 2017/0317269 A1 | 11/2017 | Zhang et al. | |
| 2017/0336641 A1 | 11/2017 | Von Und Zu Liechtenstein | |
| 2018/0255250 A1 | 9/2018 | Price et al. | |
| 2018/0275394 A1 | 9/2018 | Yeoh et al. | |
| 2018/0335649 A1 | 11/2018 | Tsai | |
| 2019/0173128 A1 | 6/2019 | Visco et al. | |
| 2019/0243123 A1 | 8/2019 | Bohn | |
| 2019/0296218 A1 | 9/2019 | Ouderkirk et al. | |
| 2019/0302479 A1 | 10/2019 | Smyth et al. | |
| 2020/0166742 A1 | 5/2020 | Peyman | |
| 2020/0251709 A1 | 8/2020 | Lee et al. | |

FOREIGN PATENT DOCUMENTS

| | | |
|---|---|---|
| WO | 2008/156166 A1 | 12/2008 |
| WO | 2010/078666 A1 | 7/2010 |
| WO | 2010/104904 A2 | 9/2010 |
| WO | 2019/183431 A1 | 9/2019 |
| WO | 2019/190887 A1 | 10/2019 |

OTHER PUBLICATIONS

Andrew John Ouderkirk, et al.; Electroactive Polymer Devices, Systems, And Methods; U.S. Appl. No. 16/035,562, filed Jul. 13, 2018.

"Adjustable Reading Glasses," URL: https://adlens.com/, retrieved on May 7, 2018, 1 page.

Guha et al., "Creating nanoscale emulsions using condensation", Nature Communications, vol. 8, No. 1371, Nov. 2017, pp. 1-7.

Merriam-Webster, "Porosity", URL: https://www.merriam-webster.com/dictionary/porosity, retrieved on Apr. 8, 2020, pp. 1-8.

International Search Report and Written Opinion received for PCT Application Serial No. PCT/US2019/023484 dated Jul. 3, 2019, 9 pages.

International Preliminary Report on Patentability received for PCT Application Serial No. PCT/US2019/023484 dated Oct. 1, 2020, 8 pages.

International Search Report and Written Opinion received for PCT Application Serial No. PCT/US2019/023485 dated Jul. 4, 2019, 11 pages.

(56) References Cited

OTHER PUBLICATIONS

International Preliminary Report on Patentability received for PCT Application Serial No. PCT/US2019/023485 dated Oct. 8, 2020, 8 pages.
Notice of Allowance received for U.S. Appl. No. 15/972,794 dated Oct. 16, 2020, 22 pages.
Notice of Allowance received for U.S. Appl. No. 15/992,731 dated Nov. 18, 2020, 37 pages.
Final Office Action received for U.S. Appl. No. 16/106,945 dated Nov. 24, 2020, 94 pages.
Final Office Action received for U.S. Appl. No. 16/018,752 dated Nov. 30, 2020, 41 pages.
Notice of Allowance received for U.S. Appl. No. 16/018,746 dated Nov. 3, 2020, 39 pages.
Notice of Allowance received for U.S. Appl. No. 16/021,580 dated Dec. 9, 2020, 68 pages.
Preinterview First Office Action received for U.S. Appl. No. 16/021,650 dated Feb. 1, 2021, 47 pages.
Gurvich, Mark R., "On Characterization of Anisotropic Elastomeric Materials for Structural Analysis", Rubber Chemistry and Technology, vol. 77, No. 1, 2004, pp. 115-130.
Non-Final Office Action received for U.S. Appl. No. 16/035,562 dated Jun. 10, 2021, 36 pages.
Non-Final Office Action received for U.S. Appl. No. 16/016,428 dated Jun. 16, 2021, 43 pages.
Non-Final Office Action received for U.S. Appl. No. 16/106,945 dated Mar. 30, 2021, 111 pages.
Notice of Allowance received for U.S. Appl. No. 16/018,752 dated Mar. 10, 2021, 32 pages.
Communication pursuant to Article 94(3) EPC received for EP Patent Application Serial No. 19715707.6 dated Mar. 22, 2021, 5 page.
Non-Final Office Action received for U.S. Appl. No. 16/016,428 dated Mar. 12, 2021, 56 pages.
Non-Final Office Action received for U.S. Appl. No. 16/013,837 dated Jan. 23, 2020, 22 pages.
Notice of Allowance received for U.S. Appl. No. 16/013,837 dated Apr. 14, 2020, 14 pages.
Preinterview First Office Action received for U.S. Appl. No. 15/992,731 dated Sep. 27, 2019, 17 pages.
Final Office Action received for U.S. Appl. No. 15/992,731 dated Jun. 2, 2020, 25 pages.
Non-Final Office Action received for U.S. Appl. No. 15/992,731 dated Aug. 24, 2020, 27 pages.
Examiner-Initiated Interview Summary received for U.S. Appl. No. 16/008,635 dated Apr. 20, 2020, 3 pages.
Notice of Allowance received for U.S. Appl. No. 16/008,635 dated May 4, 2020, 32 pages.
Non-Final Office Action received for U.S. Appl. No. 16/059,091 dated Apr. 8, 2020, 54 pages.
Final Office Action received for U.S. Appl. No. 16/059,091 dated Sep. 21, 2020, 18 pages.
Non-Final Office Action received for U.S. Appl. No. 16/106,945 dated Apr. 16, 2020, 59 pages.
Non-Final Office Action received for U.S. Appl. No. 16/041,634 dated Jul. 30, 2020, 24 pages.
Notice of Allowance received for U.S. Appl. No. 16/041,634 dated Aug. 28, 2020, 31 pages.
Preinterview First Office Action received for U.S. Appl. No. 16/018,752 dated Dec. 16, 2019, 19 pages.
Preinterview First Office Action received for U.S. Appl. No. 16/018,746 dated Jul. 14, 2020, 20 pages.
Notice of Allowance Action received for U.S. Appl. No. 16/018,746 dated Sep. 17, 2020, 24 pages.
Preinterview First Office Action received for U.S. Appl. No. 16/021,580 dated Aug. 4, 2020, 48 pages.
Billah et al., "Microstructure Evolution and Electrical Characterization of Lanthanum doped Barium Titanate (BaTi03) Ceramics", International Conference on Mechanical Engineering, AIP Conf. Proc. 1754, accessed on Jul. 12, 2016, pp. 030006-1-030006-7.
Cao et al., Grain Size and Domain Size Relations in Bulk Ceramic Ferroelectric Materials, J. Phys. Chem Solids vol. 57, No. 10, pp. 1499-1505, 1996.
Ding et al., "Surface profiling of an aspherical liquid lens with a varied thickness membrane," Optics Express 3122-3132, vol. 25, No. 4 (Feb. 6, 2017).
He et al., Linear Electro-Optic Properties of Orthorhombic PZN-8%PT Single Crystal, IEEE Transactions on Ultrasonics, Ferroelectrics, and Frequency Control, vol. 58, No. 6 (Jun. 1, 2011).
Optotune, "Focus tunable lenses", accessed at http://www.optotune.com/technology/focus-tunable-lenses, accessed on Mar. 13, 2018, 2 pages.
Polight, "How does it work", accessed at http://www.polight.com/technology-and-products/how-does-it-work/default.aspx, accessed on Mar. 13, 2018, 3 pages.
Keplinger et al., "Stretchable, Transparent, Ionic Conductors", Science Magazine, vol. 341, DOI:10.1126/science.1240228, Accessed on Aug. 30, 2013, pp. 984-987.
Kong et al., "Transparent Ceramic Materials", Transparent Ceramics, Topics in Mining, Metallurgy, and Materials Engineering, Ch. 2, DOI: 10.1007/978-3-319-18956-7_2, Springer international Publishing Switzerland 2015, pp. 29-91.
Patra et al., "Comparison on Optical Properties of Pure and Doped Lithium Tetraborate Single Crystals and Glasses", Solid State Physics: Proceedings of the 56th DAE Solid State Physics Symposium 2011, AIP Conf. Proc. 1447, Dec. 11, 2012, pp. 1335-1336.
Riegler et al., "Index Matching Silicone for High Brightness LED Packaging", IMAPS International Conference on Device Packaging Mar. 13-16, Scottsdale AZ., Accessed on Mar. 18, 2005, 17 Pages.
Shian et al., Tunable Lenses using Transparent Dielectric Elastomer Actuators, Optics Express, vol. 21, No. 7 (Apr. 2, 2013).
Wang et al., "A Highly Stretchable, Transparent, and Conductive Polymer", Science Advances vol. 3, No. 3, e1602076, Mar. 10, 2017, pp. 1-10.
Zhao et al., "Spherical aberration free liquid-filled tunable lens with variable thickness membrane," Optics Express vol. 23, No. 16, accessed at https://doi.org/10.1364/0.23.021264, accessed on Aug. 5, 2015, pp. 21264-21278.
Andrew J. Ouderkirk, et al.; Apparatuses, Systems, And Methods For Adjusting Fluid Lenses; U.S. Appl. No. 16/008,635, filed Jun. 14, 2018.
Katherine Marie Smyth, et al.; Optical Lens Assemblies, Head-Mounted Displays, and Related Methods; U.S. Appl. No. 16/021,650, filed Jun. 28, 2018.
Andrew John Ouderkirk, et al.; Multi-Element Prescription Lenses With Eye-Tracking; U.S. Appl. No. 16/041,634, filed Jul. 20, 2018.
Andrew John Ouderkirk, et al.; Electroactive Polymer Devices And Nanovoided Polymer Materials And Methods And Systems For Fabrication Thereof; U.S. Appl. No. 16/106,945, filed Aug. 21, 2018.
Andrew John Ouderkirk, et al.; Nanovoided Electroactive Polymer Devices, Systems, And Methods; U.S. Appl. No. 16/041,858, filed Jul. 23, 2018.
Andrew John Ouderkirk, et al.; Electroactive Polymer Devices, Systems, And Methods; U.S. Appl. No. 16/059,091, filed Aug. 9, 2018.
Andrew John Ouderkirk, et al.; Optical Devices, Systems, And Methods Of Manufacturing; U.S. Appl. No. 62/646,900, filed Mar. 22, 2018.
Andrew John Ouderkirk, et al.; Optical Devices, Systems, And Methods Of Manufacturing; U.S. Appl. No. 62/650,254, filed Mar. 29, 2018.
Katherine Marie Smyth, et al.; Optical Lens Assemblies And Related Methods; U.S. Appl. No. 16/018,746, filed Jun. 26, 2018.
Katherine Marie Smyth, et al.; Systems And Methods For Actuation Of Asymmetric Optical Elements; U.S. Appl. No. 15/992,731, filed May 30, 2018.
Andrew John Ouderkirk, et al.; Optical Lens Assemblies And Related Methods; U.S. Appl. No. 16/018,752, filed Jun. 26, 2018.
John M. Cooke, et al.; Optical Lens Assemblies, Head-Mounted Displays, And Methods Of Altering Optical Properties Of Optical Lens Assemblies; U.S. Appl. No. 16/013,837, filed Jun. 20, 2018.

(56) References Cited

OTHER PUBLICATIONS

Katherine Marie Smyth, et al.; Optical Lens Assemblies, Head-Mounted Displays, And Related Methods; U.S. Appl. No. 16/016,428, filed Jun. 22, 2018.

APC International, Ltd., "Piezoelectric Materials, New Materials, Piezo Theory," Retrieved on Mar. 15, 2018, 1 page, Retrieved from the Internet: URL: https://www.americanpiezo.com/knowledge-center/piezo-theory/new-materials.html.

Hocking L.M., "The Effect of Slip on the Motion of a Sphere Close to a Wall and of Two Adjacent Spheres," Journal of Engineering Mathamatics, 1973, vol. 7 (3), pp. 207-221.

Jiang H., et al., "Transparent Electro-Optic Ceramics and Devices," Optoelectronic Devices and Integration, Proceedings of Society of Photo-Optical Instrumentation Engineers (SPIE), Jan. 17, 2005, vol. 5644, pp. 380-394, Retrieved from the Internet: URL: https://doi.org/10.1117/12.582105.

Knapp K., et al., "Understanding Zirconia Crown Esthetics and Optical Properties," Retrieved on Jun. 12, 2018, vol. 2 (4), 17 pages, Retrieved from the Internet: URL: http://glidewelldental.com/education/inclusive-dental-implant-magazine-volume-2-issue-4/.

Piezo Technology, "Displacement Modes of Piezoelectric Actuators," Retrieved on Mar. 14, 2018, 12 pages, Retrieved from the Internet: URL: https://www.piceramic.com/enpiezo-technology/properties-piezo-actuators/displacement-modes/.

Piezo Technology, "Highly Reliable Multilayer Piezo Actuators," Retrieved on Mar. 14, 2018, 8 pages. Retrieved from the Internet: URL: https://www.piceramic.com/en/piezo-technology/picma/.

Press Kit Home, "Adaptive Glasses," Retrieved on Mar. 13, 2018, 5 pages, Retrieved from the Internet: URL: http://tvc.utah.edu/ces/press-kit.php.

UZOOM Adlens, "Adjustable Lens Glasses: How They Work," Retrieved on Mar. 28, 2018, 9 pages, Retrieved from the Internet: URL: https://adlens.com/how-it-works/.

\* cited by examiner

OPTICAL LENS ASSEMBLIES AND RELATED METHODS

CROSS REFERENCE TO RELATED APPLICATION

This application is a continuation of U.S. Non-Provisional patent application Ser. No. 16/018,746, filed Jun. 26, 2018, which claims the benefit of U.S. Provisional Application No. 62/650,254, filed Mar. 29, 2018, the entire disclosure of each of which is incorporated herein by this reference.

BACKGROUND

Adjustable-lens systems may be useful in a variety of devices, including eyeglasses, cameras, instrumentation, and virtual or augmented reality ("VR/AR") systems, such as to adjust the focus of a display element (e.g., screen) or of a real-world image viewed by a user. One example of an adjustable-lens system is a "liquid lens" assembly. As accommodative elements, liquid lenses may be varifocal, may have high transmissivity, and with proper optical design can achieve low off-axis aberration and distortion for high image quality over a range of optical powers.

Liquid lenses may often include a flexible membrane that is directly coupled to a rigid backplane and a fluid that is disposed between the rigid backplane and the membrane. Inducing a change in fluid pressure may result in a convex or concave lens shape, which may be defined by a flexible membrane defining the lens shape. The lens shape formed by the shaped flexible membrane may not be ideal for some applications. For example, the edge of the lens may have a shape that is distorted by forces applied by attachments of the membrane to mechanical support structures. In addition, it may be difficult, expensive, or impossible to customize the membranes to achieve desired optical properties, such as to account for certain inter-pupillary distances or ophthalmic corrections.

SUMMARY

As will be described in greater detail below, the present disclosure describes optical lens assemblies and head-mounted displays ("HMDs") including deformable elements that may have a non-uniform strain or stress profile, as well as related methods.

In some embodiments, the present disclosure includes optical lens assemblies that include a pre-strained deformable element that may exhibit at least one of a non-uniform mechanical strain or stress profile, a structural support element coupled to the pre-strained deformable element, and a deformable medium positioned between the pre-strained deformable element and the structural support element.

In some examples, the non-uniform mechanical strain or stress profile may be a result of a variable pre-tension applied to the pre-strained deformable element, and/or may be a result of residual stress within the pre-strained deformable element. The pre-strained deformable element may include a central region and an edge region proximate a peripheral edge of the pre-strained deformable element, and the pre-strained deformable element may exhibit a mechanical strain or stress in the central region that is different than a mechanical strain or stress in the edge region. For example, the mechanical strain or stress in the central region may be less than (e.g., at least about two percent less than) the mechanical strain or stress in the edge region. In some embodiments, the mechanical strain or stress in the central region may be greater than the mechanical strain or stress in the edge region.

In some examples, the non-uniform mechanical strain or stress profile may be configured to correct for at least a portion of a cylindrical error of a user's eye. The non-uniform mechanical strain or stress profile may be based, at least in part, on an inter-pupillary distance of a user. The non-uniform mechanical strain or stress profile may be configured to counter gravity sag in the pre-strained deformable element. A display element may be positioned proximate to the pre-strained deformable element. When deformed, the pre-strained deformable element may alter an optical property of the optical lens assembly.

In some embodiments, the present disclosure includes methods of fabricating an optical lens assembly. In one example of such methods, at least one of a non-uniform mechanical strain or stress profile may be induced in a deformable element. The deformable element may be positioned over a structural support element. A deformable medium may be disposed between the deformable element and the structural support element.

In some examples, inducing the non-uniform mechanical strain or stress profile in the deformable element may include at least one of conditioning a material of the deformable element or stretching the material of the deformable element. Conditioning the material of the deformable element may include thermoforming a polymer to a non-planar profile. In further examples, conditioning the material of the deformable element may include selectively exposing portions of the material of the deformable element to heat to induce residual strain or stress in the material of the deformable element, and/or selectively polymerizing portions of the material of the deformable element to induce residual strain or stress in the material of the deformable element. Stretching the material of the deformable element may include at least one of uniaxially stretching the material, biaxially stretching the material, or stretching the material along at least one axis that is angled from vertical and horizontal relative to an intended orientation of the optical lens assembly when in use. When deformed, the deformable element may alter an optical property of the optical lens assembly.

In some embodiments, the disclosed methods of fabricating an optical lens assembly may include determining a set of desired optical properties of the optical lens assembly for a user, providing a deformable element having a central region encompassing an optical axis and an edge region proximate a peripheral edge of the deformable element, and inducing at least one of a non-uniform mechanical strain or stress profile in the deformable element. The non-uniform mechanical strain or stress profile may be selected to substantially obtain the set of desired optical properties. The deformable element may be positioned over a structural support element. A deformable medium may be disposed between the deformable element and the structural support element.

In some examples, the set of desired optical properties may include at least one of a correction of at least one optical aberration, an optical centration location, or an ophthalmic correction. Inducing the non-uniform mechanical strain or stress profile in the deformable element may be performed before determining the set of desired optical properties of the optical lens assembly for the user. Providing the deformable element may include selecting the deformable element with the induced non-uniform mechanical strain or stress profile from a group of deformable elements with respective different mechanical strain or stress profiles.

In some examples, deformation of the deformable element positioned over the structural support element may alter at least one optical property of the optical lens assembly. Inducing the non-uniform mechanical strain or stress profile in the deformable element may include at least one of stretching a material of the deformable element, thermoforming the material of the deformable element to a non-planar profile, or selectively exposing portions of the material of the deformable element to heat to modify residual strain or stress in the material.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
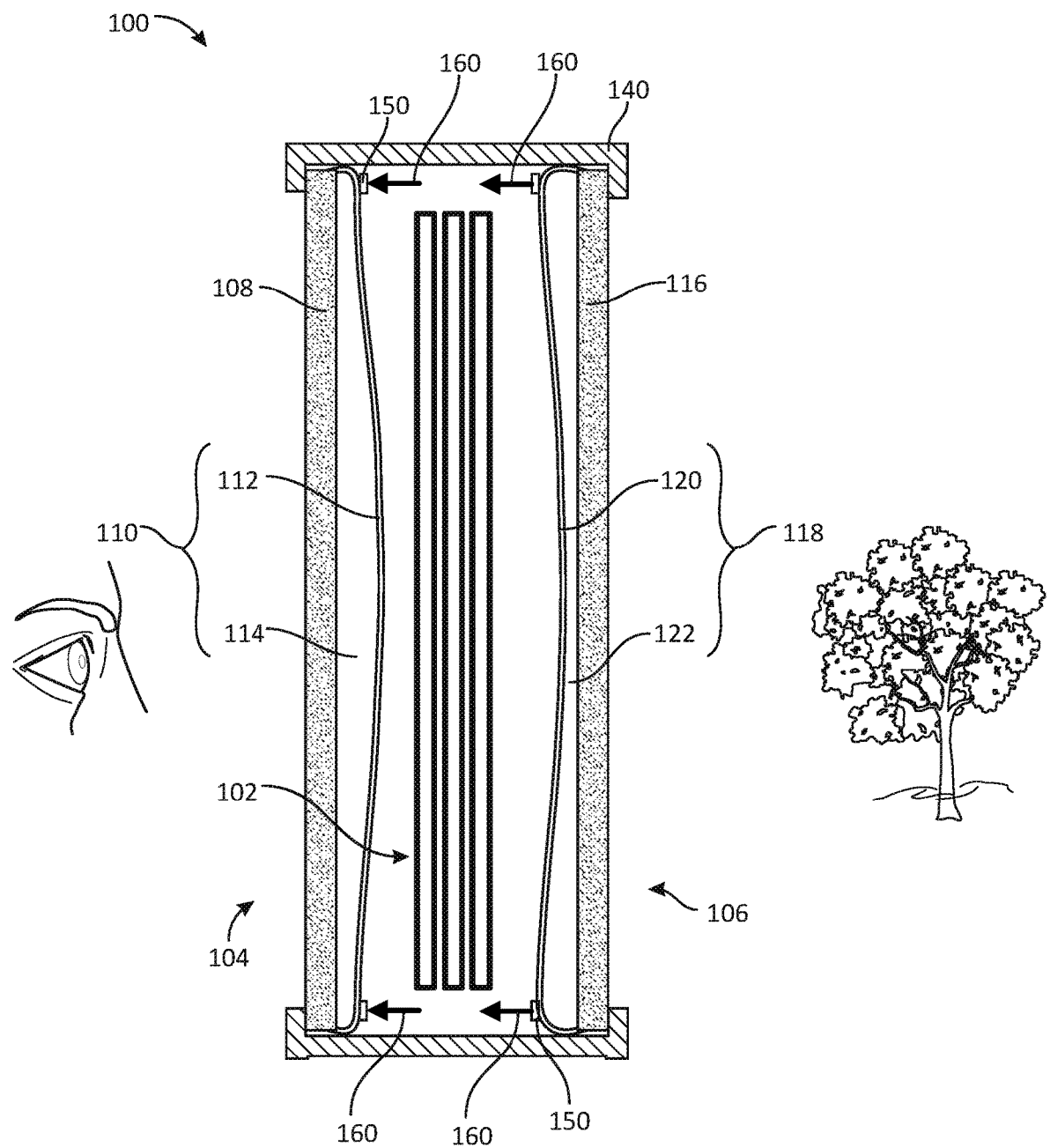
FIG. 1 is a cross-sectional side view of an optical lens assembly in an actuated state, according to an embodiment of the present application.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, combinations, and alternatives falling within the scope of the appended claims.

DETAILED DESCRIPTION OF EXAMPLE EMBODIMENTS

The present disclosure is generally directed to optical lens assemblies, HMDs, and related methods. As will be explained in greater detail below, embodiments of the present disclosure may include optical lens assemblies that include a deformable element having a non-uniform mechanical strain or stress profile. The non-uniform mechanical strain or stress profile may facilitate achieving desired optical properties upon deformation the deformable element. Methods of fabricating such optical lens assemblies and deformable elements include inducing a non-uniform mechanical strain or stress profile in the deformable elements, such as by pre-forming the deformable elements to have a non-planar shape, pre-stretching the deformable elements, and/or selectively heating at least a portion of the deformable elements, etc. Such methods may result in commercially feasible adjustable optical lens assemblies that may address conventional difficulties in customization or achievement of certain optical properties.

Figure 2:
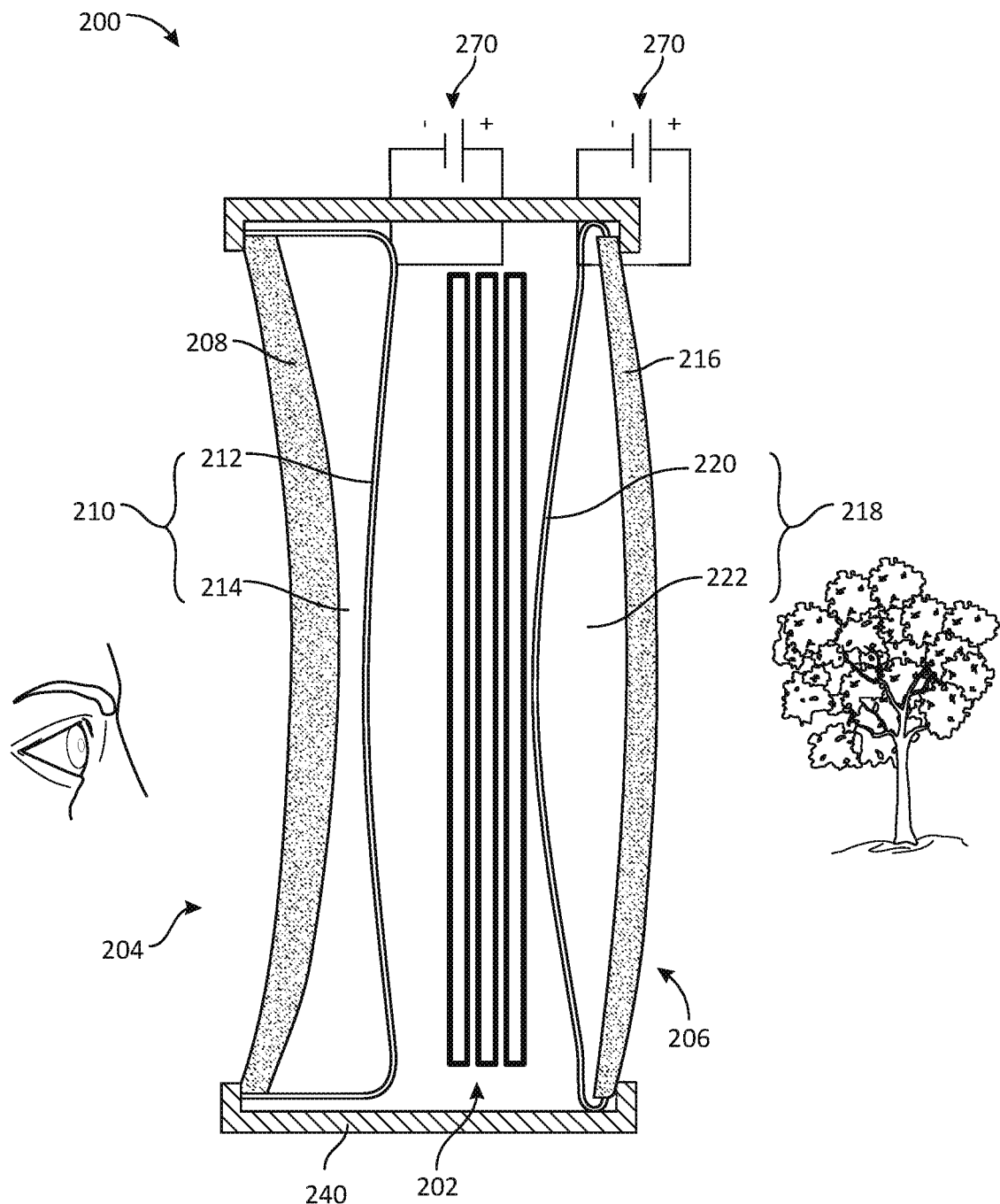
FIG. 2 is a cross-sectional side view of an optical lens assembly in an actuated state, according to another embodiment of the present application.

The following will provide, with reference to FIGS. 1 and 2, detailed descriptions of example optical lens assemblies that include a deformable element that may have a non-uniform mechanical strain or stress profile. The description of FIG. 3 relates to an embodiment of an HMD that includes optical lens assemblies according to the present disclosure. With reference to FIGS. 4-9, the following will provide detailed descriptions of strain profiles and other properties of disclosed optical lens assemblies. The discussion relating to FIGS. 10 and 11 will provide detailed descriptions of various methods of fabricating optical lens assemblies according to the present disclosure.

FIG. 1 shows a cross-sectional side view of an optical lens assembly 100 in an actuated state. The optical lens assembly 100 may include a proximal optical lens subassembly 104 (also referred to as the "proximal subassembly 104" for simplicity) for positioning close to a user's eye, and a distal optical lens subassembly 106 (also referred to as the "distal subassembly 106 for simplicity) for positioning away from the user's eye. The optical lens assembly 100 may also include a housing 140 (e.g., a frame element of an HMD) for supporting the optical lens subassemblies 104, 106, which may at least partially cover a peripheral edge of the optical lens subassemblies 104, 106. The housing 140 may also support a display element 102 (e.g., an electronic display element, etc.) for displaying an image to the user. The display element 102 may be positioned adjacent to and between the optical lens subassemblies 104, 106.

The proximal subassembly 104 may include a rigid or semi-rigid proximal structural support element 108 and a proximal deformable optical element 110 (including a proximal deformable element 112 and a proximal deformable medium 114) positioned over the structural support element 108. In some examples, relational terms such as "over," "on," "downward," "upward," "highest," "lowest," etc., may be used for clarity and convenience in understanding the disclosure and accompanying drawings, and does not necessarily connote or depend on any specific preference, orientation, or order, except where the context clearly indicates otherwise. The proximal deformable element 112 may be directly (e.g., bonded, adhered) or indirectly (e.g., via a separate component or material) coupled to the proximal structural support element 108.

As shown in FIG. 1, in embodiments in which the proximal deformable element 112 is directly coupled to the proximal structural support element 108, an outer periphery of the proximal deformable element 112 may define an edge seal for containing the proximal deformable medium 114 in a cavity defined between the proximal deformable element 112 and the proximal structural support element 108. A force distributor ring 150, which may also function as a pretension ring for maintaining a pre-tension in the proximal deformable element 112, may be positioned over the proximal deformable element 112 proximate the outer periphery of the deformable element 112. Similarly, the distal subassembly 106 may include a distal structural support element 116 and a distal deformable optical element 118 (including a distal deformable element 120 and a distal deformable medium 122). Another force distributor ring 150 may be coupled to the distal deformable element 120. The structural support elements 108, 116 may be positioned on external sides of the optical lens assembly 100, and the deformable optical elements 110, 118 may be positioned on internal sides of the optical lens assembly 100 facing the display element 102.

Each of the structural support elements 108, 116, the deformable elements 112, 120, and the deformable media 114, 122 may be substantially transparent to allow light to pass therethrough to an eye of a user. Accordingly, at least portions of the structural support elements 108, 116 and of the deformable optical elements 110, 118 may be positioned in an optical aperture of the optical lens assembly 100, which may refer to a portion of the optical lens assembly 100 that allows the passage of light to a user's eye.

In some examples, the phrase "substantially transparent" may refer to an element exhibiting greater than about 20% transmissivity and less than about 10% haze in the visible light spectrum. In some examples, the term "substantially," in reference to a given parameter, property, or condition may generally refer to a degree that one of ordinary skill in the art would understand that the given parameter, property, or condition is met with a small degree of variance, such as within acceptable manufacturing tolerances. By way of example, depending on the parameter, property, or condition that is substantially met, the parameter, property, or condition may be at least 90% met, at least 95% met, at least 99% met, etc. In some examples, the phrase "deformable optical element" may refer to an element (including one or more materials or sub-elements) that is configured to be deformed to alter an optical property (e.g., an accommodative property or an adaptive optical property) of the optical lens assembly. In some examples, the term "accommodative" or "accommodation" may refer to changes in an optical power. In some examples, the term "adaptive" may refer to tunability for providing control, compensation, and/or correction of wave front errors such as distortion and aberration(s). In some examples, "aberration" may generally refer to an optical image defect, including any deviation from diffraction-limited optical performance. Aberrations can be chromatic or monochromatic and include, for example, tilt, defocus, astigmatism, coma, distortion, field curvature, spherical errors, cylindrical errors, etc.

The structural support elements 108, 116, deformable optical elements 110, 118, and force distributor rings 150 may be coupled to and supported by the housing 140 (e.g., an eyeglass frame element, an AR or VR headset frame element, etc.). In FIG. 1, the deformable element 120 and deformable medium 122 are shown in an actuated state, with an actuation force 160 acting on the force distributor rings 150 in a direction toward the user's eyes. Because of the actuation force 160, the proximal deformable optical element 110 may have a convex shape to exhibit a positive-optical power, and the distal deformable optical element 118 may have a concave shape to exhibit a negative-optical power. In some embodiments, in a non-actuated state (i.e., with no applied actuation force 160), a surface of the deformable elements 112, 120 may each have a substantially planar shape, and the optical lens assembly 100 may be configured and positioned to not substantially alter an image or view passing through the optical lens assembly 100. In other words, the non-actuated state may be a substantially zero-optical power state.

Although FIG. 1 illustrates separate actuation forces 160 respectively acting on both force distributor rings 150 of the proximal and distal subassemblies 104, 106, the present disclosure is not so limited. For example, a single actuation force 160 applied by a single actuator may act on both force distributor rings 150 of the proximal subassembly 104 and of the distal subassembly 106. Thus, the proximal and distal subassemblies may be jointly or separately actuated, as may be appropriate for different applications.

In some examples, the optical lens assembly 100 illustrated in FIG. 1 may be used to reduce or eliminate the negative impact of a phenomenon known as the "vergence-accommodation conflict." Traditional AR displays may attempt to create the illusion that a virtual object is set at a distance in the real-world environment by displaying virtual images to the left eye and to the right eye with a relative offset, such that a user's eyes converge on the desired real-world focal point to align the left- and right-side virtual images. At the same time, the user's left and right eyes also undergo accommodation to bring the respective left- and right-side virtual images into focus. However, the distance of the real-world focal point may frequently differ from the distance of the augmented-reality display, causing a difference between the apparent vergence distance and the apparent accommodation distance of a virtual object. Unfortunately, because the human visual system is adapted to the expectation that the apparent vergence distance and the apparent accommodation distance of a real-world object will match, the mismatch frequently posed by traditional augmented reality systems may confuse a user's vision, potentially breaking a sense of immersion—or even causing physical discomfort.

The optical lens assembly 100 illustrated in FIG. 1 may be configured to address the vergence-accommodation conflict. For example, an actuation force 160 from an actuator (e.g., an electromechanical actuator) is shown in FIG. 1 as being applied in a direction toward the user's eye, such that the proximal deformable optical element 110 forms a convex shape and the distal deformable optical element 118 forms a concave shape. Conversely, if the actuation force 160 is applied in a direction away from the user's eye, the proximal deformable optical element 110 may form a concave shape and the distal deformable optical element 118 may form a convex shape. Upon actuation in either direction, the proximal deformable optical element 110 may be configured to adjust the user's view of an image rendered on the display element 102. The distal deformable optical element 118 may be configured to substantially counteract the adjustments of the proximal deformable optical element 110 with respect to the user's view of a surrounding real-world environment. In other words, the two deformable optical elements 110, 118 may together modify the apparent accommodation distance of a virtual object or scene shown on the display element 102, while reducing or eliminating any distortion of the appearance of the real-world environment through the optical lens assembly 100.

In some examples, the term "electromechanical actuator" may refer to a piezoelectric material or device, an electroactive polymer, an electrostrictive polymer, a shape memory alloy, a voice coil, a pneumatic actuator, an electromagnetic motor (including for example a servo motor, a stepper motor, a DC motor, or a similar motor), a hydraulic actuator, or a combination thereof. In some examples, the term "electroactive" may refer to a property of a material or composite material that deforms in response to an application of electrical energy (e.g., a voltage) and may generate electrical energy when strained or deformed. Example electroactive materials include piezoelectric materials, electrostrictor materials, dielectric elastomers, and ionic polymer conductors. Electroactive materials may function as transducers or as a component of transducers for actuating and deforming the deformable optical elements 110, 118.

The structural support elements 108, 116 may be or include a substantially transparent material with a higher relative rigidity than the deformable elements 112, 120 and the deformable media 114, 122. By way of example, the structural support elements 108, 116 may be or include one or more of a glass material, a sapphire material, a crystal material (e.g., quartz), a polycarbonate material, another polymer material, or a non-polymeric material. The structural support elements 108, 116 may provide a protective barrier for the user's eye, for the deformable optical elements 110, 118, and for other components of the optical lens assembly 100 (e.g., the display element 102, an actuator, etc.).

The proximal structural support element 108 may also include an eye-tracking element, which may be configured for estimating an inter-pupillary distance of the user's eyes, a gaze distance, and/or a focal point. The eye-tracking element, if present, may include a selective-transmission element that transmits light having a selected property and that does not transmit light that does not have the selected property. For example, the proximal structural support element 108 may include a coating or material that allows visible light to pass while reflecting non-visible light (e.g., infrared light). In this example, an infrared light source may direct infrared light to the proximal structural support element 108, which may be reflected onto the user's eye. An infrared camera may detect infrared light that is reflected from the user's eye and back to the proximal structural support element 108, to track the user's eye.

As shown in FIG. 1, the structural support elements 108, 116 may each be a substantially planar element that does not substantially alter an image viewed through the structural support elements 108, 116. In other embodiments, the structural support elements 108, 116 may include a corrective ophthalmic lens (e.g., a positive-optical power lens, a negative-optical power lens, a lens for correction of an aberration, etc.), or another optical lens element. Optionally, an anti-reflective coating may be applied to the structural support elements 108, 116. The outer periphery of the deformable elements 112, 120 may be directly or indirectly coupled to the respective structural support elements 108, 116, which may define cavities therebetween for containing the deformable media 114, 122.

The deformable elements 112, 120 may include a substantially transparent, flexible film of a single material or multiple materials. By way of example and not limitation, the deformable elements 112, 120 may include at least one of a polymer material (e.g., a thermoset polymer, a thermoplastic polymer, an elastomer, a silicone material, polydimethylsiloxane, a polyurethane elastomer, a fluoropolymer material, polyvinylidene fluoride or a copolymer thereof, a polyolefin material, a polyacrylate material, etc.), a ceramic material, a glass material, a crystalline (e.g., substantially single-crystal) material, or a composite material. The deformable elements 112, 120 may be or include a single material or a multi-layer structure. The deformable elements 112, 120 may include a barrier material for controlling gas or liquid diffusion, an anti-reflective material, or a combination thereof. In some examples, a material of the deformable elements 112, 120 may include a flexible, transparent, water-impermeable material, such as clear and elastic polyolefins, polycycloaliphatics, polyethers, polyesters, polyimides and/or polyurethanes, for example, polyvinylidene chloride films, including commercially available films, In some examples, and depending on the material and configuration selected for the deformable elements 112, 120, the deformable elements 112, 120 may be pre-tensioned to achieve a desired profile and response to actuation and/or to reduce the negative effects of so-called "gravity sag." Gravity sag may refer to a lower portion of the deformable optical elements 112, 120 being thicker on average than an upper portion, due to gravity urging the deformable elements 112, 120 and/or deformable media 114, 122 downward.

One or both of the deformable elements 112, 120 may have a non-uniform mechanical strain or stress profile when in a non-actuated state. Examples of deformable elements having non-uniform mechanical strain or stress profiles and example methods for achieving non-uniform mechanical strain or stress profiles are described below, such as with reference to FIGS. 4-11.

Referring again to FIG. 1, the deformable media 114, 122 may be a substantially transparent material with mechanical properties that allow for deformation upon actuation of the optical lens assembly 100. By way of example and not limitation, the deformable media 114, 122 may be or include a gas (e.g., air, nitrogen, etc.), a liquid (e.g., water, degassed water, mineral oil, saline solution, a high-refractive index liquid, etc.), a polymer material, a gel (e.g., a silicone gel), or a foam (e.g., a silica aerogel), etc.

FIG. 2 shows an embodiment of an optical lens assembly 200 similar to the optical lens assembly 100 described above with reference to FIG. 1, but with a curved proximal structural support element 208 and a curved distal structural support element 216, rather than the substantially planar structural support elements 108, 116 shown in FIG. 1. For example, one or both structural support elements 208, 216 may be or include a corrective ophthalmic lens or a curved zero-optical power lens (e.g., a zero-power meniscus lens). A shape of the proximal and/or distal structural support elements 208, 216 may, in some embodiments, be tailored to or selected in consideration of a specific user to correct vision impairments or to otherwise meet user preferences.

In some examples, for realization of a sub-assembly with similar functionality to the sub-assembly in FIG. 1, the structural support elements 208, 216 in FIG. 2 can be zero-power meniscus lens elements for improved anti-reflective properties and easier integration with potentially non-flat optical eye-tracking and/or ophthalmic optical elements at the proximal structural support element 208. A zero-optical power curved lens may provide some advantages over a substantially planar lens for some applications, such as for improved anti-reflective properties and/or improved fit to a user's facial contours, for example.

The optical lens assembly 200 may include a proximal optical lens subassembly 204 and a distal optical lens subassembly 206. The proximal optical lens subassembly 204 may include the proximal structural support element 208 and a proximal deformable optical element 210 (including a proximal deformable element 212 and a proximal deformable medium 214). The distal optical lens subassembly 206 may include the distal structural support element 216, a distal deformable optical element 218 (including a distal deformable element 220 and a proximal deformable medium 222). A display element 202 and the optical lens subassemblies 204, 206 may be mounted on a housing 240.

In addition, FIG. 2 illustrates an actuation mechanism different from that of the embodiment of FIG. 1. For example, instead of actuation by an applied actuator force 160 on a force distributor ring 150, the deformable elements 212, 220 of FIG. 2 may each include an electroactive material configured to deform upon application of a sufficient voltage by a driver circuit 270. For example, substantially transparent dielectric elastomers, piezoelectrics including polymers like polyvinylidene fluoride ("PVDF") and its copolymers, and/or single crystal ceramics like lithium niobate, quartz, $K_{0.5}$ $Na_{0.5}$ $NbO_3$ ("KNN"), barium titanate, lithium niobate, lithium tetraborate, quartz, lead zirconate titanate, $Pb(Mg_{1/3}Nb_{2/3})O_3$-$PbTiO_3$, and/or $Pb(Zn_{1/3}Nb_{2/3})O_3$-$PbTiO_3$, etc. are electroactive materials that may be included in the deformable elements 212, 220. With dielectric elastomers or other forms of electroactive polymers, for example, the deformable elements 212, 220 may include rigid or semi-rigid structural materials for load bearing or for reducing or eliminating the level of pre-tension in the deformable elements 212, 220. In these cases, alternative architectures with a wider range of potential material selection, material geometries, and boundary conditions may improve performance and manufacturability.

Additionally, the deformable elements 212, 220 may include electrodes for electrically coupling the driver circuit 270 to the deformable elements 212, 220. In some examples, the electrodes may be or include a substantially transparent, electrically conductive material, such as a transparent conducting oxide, indium tin oxide, a nanocomposite material, carbon nanotubes, silver nanowires, and/or graphene.

FIG. 2 illustrates the optical lens assembly 200 in an actuated state. For example, application of a sufficient voltage and polarity on the deformable elements 212, 220 by the driver circuit 270 may deform the deformable optical elements 210, 218. In this example, the proximal deformable optical element 210 is shown as being deformed into a concave shape and the distal deformable optical element 218 is shown as being deformed into a convex shape. Conversely, the application of a sufficient voltage of an opposite polarity to that shown in FIG. 2 may result in the proximal deformable optical element 210 forming a convex shape and the distal deformable optical element 218 forming a concave shape. As discussed above with reference to FIG. 1, the optical lens assembly 200 may be configured to address the vergence-accommodation conflict.

Figure 3:
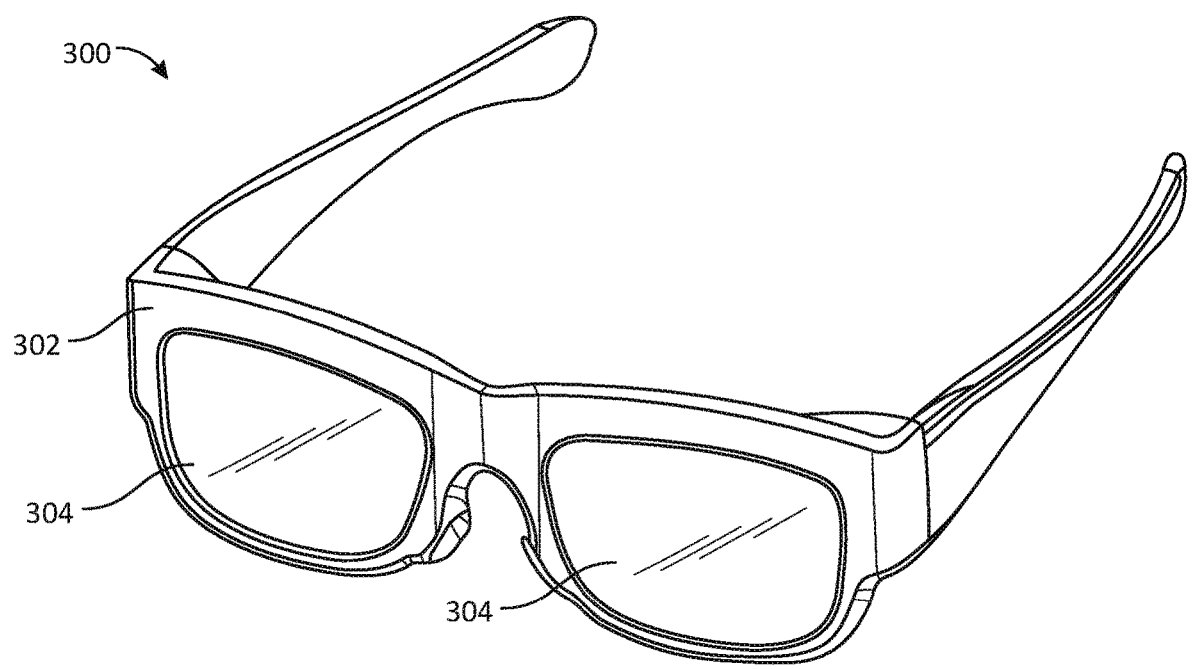
FIG. 3 is a perspective view of an HMD according to an embodiment of the present disclosure.

FIG. 3 illustrates an example HMD 300 (e.g., AR glasses, VR glasses) capable of incorporating the optical lens assemblies described herein. In one example, the HMD 300 may be dimensioned to be worn on a head of a user. The HMD 300 may include a frame element 302 for supporting at least one deformable optical lens assembly 304 according to the present disclosure. In some embodiments, the optical lens assembly(ies) 304 may be tailored to or selected in consideration of a particular user's eye. In addition to supporting the optical lens assembly(ies) 304, the frame element 302 may also support other elements, such as an actuator, a driver circuit for the actuator, a power supply element (e.g., a battery), a communication component (e.g., a component for communication via Wi-Fi, BLUETOOTH, near-field communications ("NFC"), etc.), a display element, a graphics processing unit for rendering an image on the display element, an image sensor (e.g., a camera), an eye-tracking element, etc. As shown in FIG. 3, the optical lens assembly 304 may have an asymmetric shape. In addition, the HMD 300 may have a different shape and design than is shown in FIG. 3, such as in the form of a VR headset or another shape that suits user preferences or a particular application. The optical lens assembly(ies) 304 may be or include, for example, any of the optical lens assemblies or subassemblies described in this disclosure.

Figure 4:
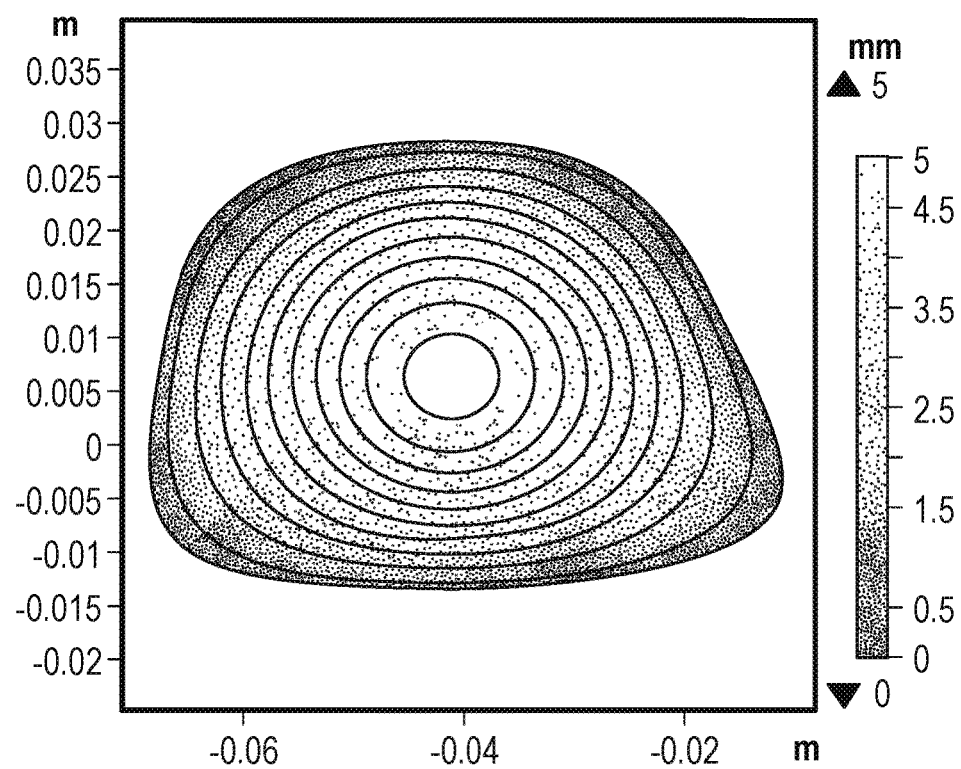
FIG. 4 is a graph illustrating a pre-formed profile of a deformable element of an optical lens assembly according to an embodiment of the present disclosure.

FIG. 4 is a graph 400 that illustrates an example pre-formed profile of a deformable element according to some embodiments of the present disclosure. The deformable element may be thermoformed out of a polymer material, such as thermoplastic polyurethane ("TPU"). In the forming process, a number of customized thermoforming molds can be used to produce a variety of stock keeping units ("SKUs") of deformable elements or associated optical lens assemblies like the approach used for glasses in the ophthalmics industry. Thus, optical lens assemblies may be fabricating to exhibit different sizes, shapes, and/or optical properties (e.g., ophthalmic correction values, maximum deformed optical powers, optical axis location to account for inter-pupillary distances for various users, etc.). For example, cylindrical curvature can be introduced for astigmatism correction, etc.

The example pre-formed TPU deformable element shown in FIG. 4 may be formed with a non-planar (e.g., curved) mold to result in the profile illustrated in the graph 400. The thermoforming of the deformable element may result in a central region of the deformable element having a highest relative elevation, sloping or tapering downward toward an outer periphery of the deformable element, which may have a lowest relative elevation. The profile shown in the graph 400 may represent a shape of the deformable element upon formation, without application of an external force (e.g., an actuation force or a stretching force) on the deformable element. After thermoforming, the deformable element may be substantially uniformly stretched and fixed to a pre-tensioning ring to hold the pre-tension in the deformable element. By pre-forming the deformable element to exhibit a non-planar shape as illustrated in the graph 400 of FIG. 4, substantially uniform stretching of the deformable element may result in non-uniform mechanical strain and/or stress. Non-uniform strain and stress in the deformable elements may be desirable in some examples and applications, such as to counteract the negative effects of gravity sag or to modify the deformed, actuated profile of the associated optical lens assemblies for specific users or sets of users having certain ophthalmic needs (e.g., aberration corrections, inter-pupillary distances, etc.). Accordingly, the pre-formed profile of the deformable element may be adjusted to customize optical lens assemblies for specific users or groups of users.

Figure 5:
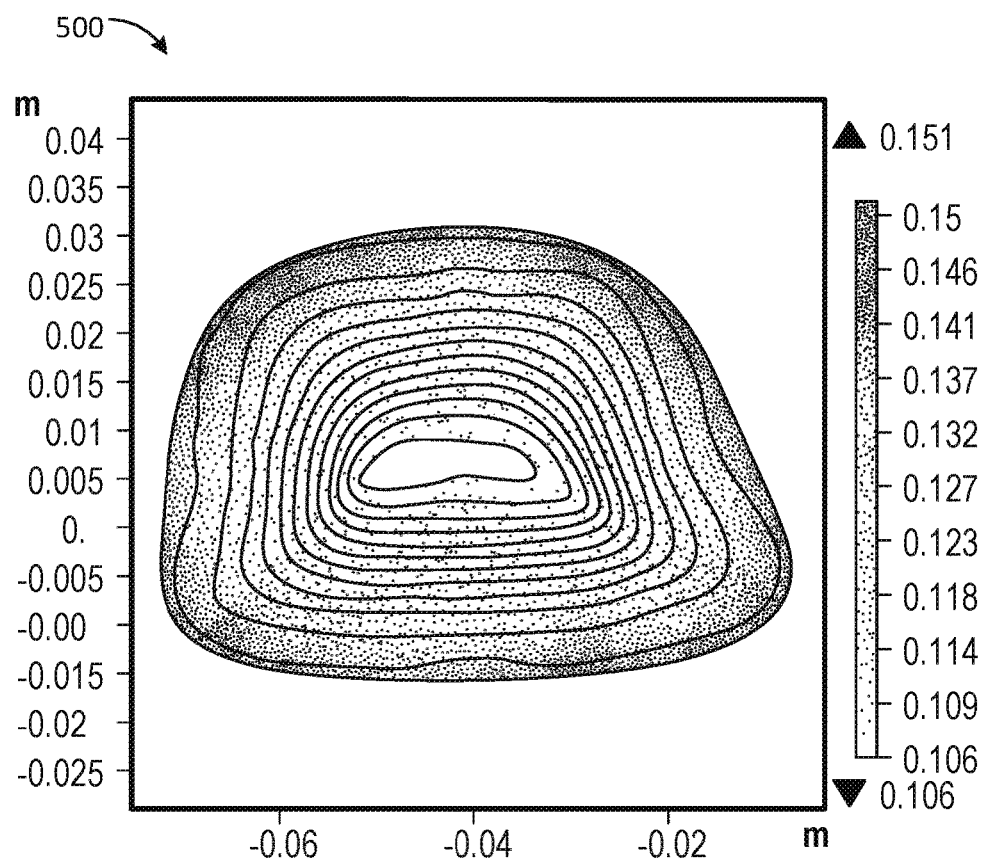
FIG. 5 is a graph showing principal strain values on an optical lens assembly after being pre-formed and uniformly stretched, according to an embodiment of the present disclosure.
Figure 6:
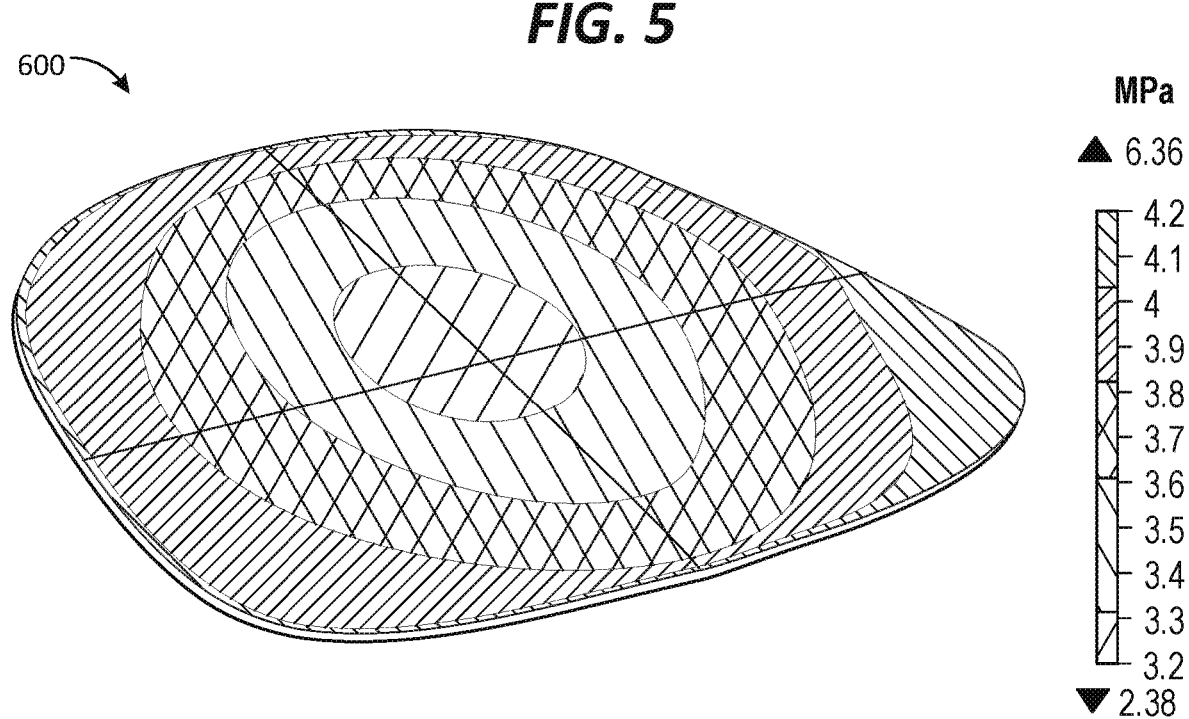
FIG. 6 is a graph showing stress values on an optical lens assembly after being pre-formed and uniformly stretched, according to an embodiment of the present disclosure.

FIG. 5 shows a graph 500 of the after-stretch principal strain and FIG. 6 shows a graph 600 of the after-stretch von Mises stress in the deformable element corresponding to the graph 400 of FIG. 4, respectively. Due to the pre-forming of the deformable element as described above with reference to FIG. 4, the stress may vary by approximately 15% and the strain may vary by approximately 30% across an area of the deformable optical element. In additional examples, the strain may vary by at least about 2%, such as by at least about 5%, or by at least about 10%. Accordingly, substantially uniform stretching of the pre-formed deformable element may result in non-uniform stress and strain in the deformable element. By way of example, the principal strain in the substantially uniformly stretched deformable element may be lowest (e.g., about 0.106 in the example of FIG. 5) in a central region of the deformable element and may be highest (e.g., about 0.140 in the example of FIG. 5) near an outer periphery of the deformable element. Similarly, the von Mises stress may be lowest (e.g., about 3.2 MPa in the example of FIG. 6) in the central region and may be highest (e.g., about 4.2 MPa in the example of FIG. 6) near the outer periphery.

Since tension may be introduced by stretching the deformable element to a given size, the pre-tension may be stated in terms of nominal principle strain (e.g., 5%, 7%, 10%, 12%, etc.). Since the thickness dimension of the deformable element may be substantially less than the corresponding lateral dimensions, the out-of-plane stress may be considered negligible in calculating load variability, for example. As an in-plane stress problem, the load variability across the deformable element may be given in terms of stress state (e.g., von Mises stress variability of 5%, 10%, 20%, 30%, etc.) because the in-plane stresses largely determine the deformation behavior.

The pre-stress condition may scale with the level of pre-tension. Therefore, the applied pre-tension may be variable across the area of the deformable element, even though a substantially uniform pre-tension may be applied at the outer periphery of the deformable element. This variability can result in a non-uniform stress and/or strain profile for reducing gravity sag by, for example, applying a larger pre-stress near the peripheral edge than in a central region, to counteract the gravity-induced pressure change where the effects are largest (e.g., along a bottom edge of the deformable optical element). Alternatively, if edge effects are of concern, a higher pre-stress may be applied in the central region for alleviating gravity sag while reducing negative edge effects. In these cases, the nominal pre-stress or pre-strain may be less than with uniform tensioning and may be locally larger in certain areas to target gravity sag.

Figure 7:
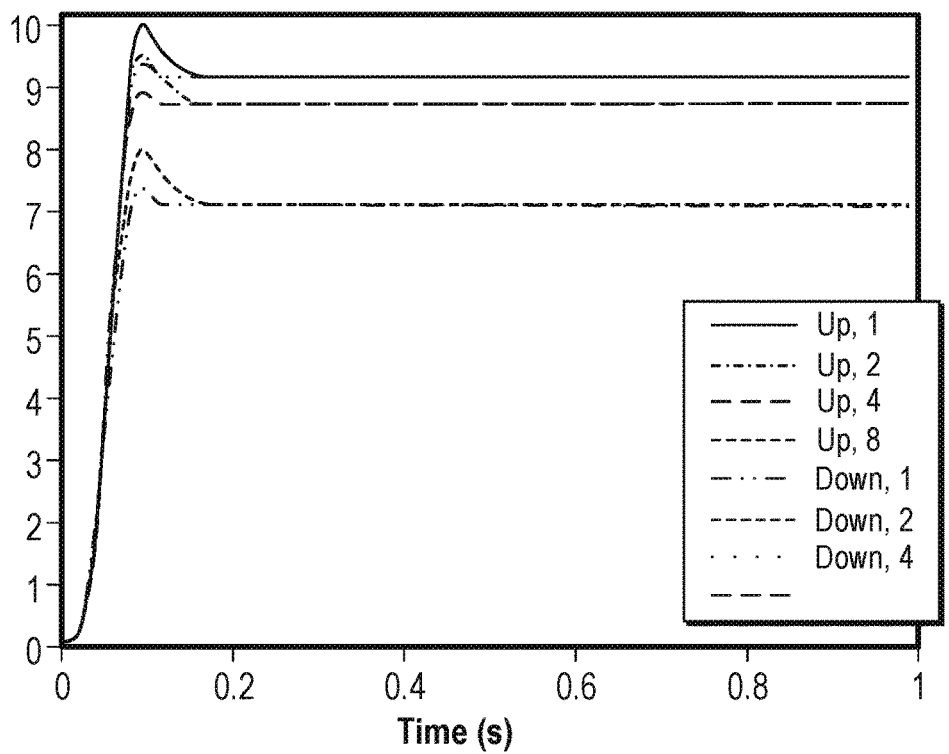
FIG. 7 is a plot showing reaction forces on a deformable optical element at various dimple heights and for different directions of actuation, according to an embodiment of the present disclosure.

FIG. 7 is a plot 700 showing reaction forces of the deformable optical element, which may be approximately equivalent to applied actuation forces. As a dimple height (i.e., a distance from a neutral, non-actuated deformable element to its highest or lowest point after actuation) increases from 1 mm to 8 mm, for example, the corresponding pre-stress variation may also increase. Embodiments with relatively larger dimple heights and pre-stress variations may exhibit a reduced actuation force requirement, as illustrated in the plot 700.

Additionally, the pre-stress condition may affect a transient response of the deformable element to the applied force and displacement of the actuator through a non-uniform mechanical strain or stress profile, which may generally correlate to a stiffness profile. A stiffness profile may be tuned to reduce or prevent undesired transient modes for high image quality and optical performance during actuation. The plot 700 of FIG. 7 compares the reaction forces for upward movement and downward movement of the optical elements and for various dimple heights. In HMDs like those shown in FIGS. 1 and 2, optical lens subassemblies having respective concave and convex curvatures may be simultaneously obtained upon actuation. During actuation, approximately equal and opposite optical powers at the proximal and distal optical lens subassemblies may improve optical quality through the two optical lens subassemblies, including during a transient response when one of the lenses is deformed to a concave shape and the other of the lenses is deformed to a convex shape. Thus, substantially matching the upward and downward reaction forces, such as by pre-forming the deformable elements as described above with reference to FIGS. 4-6, may improve a user's visual experience during actuation.

Figure 8:
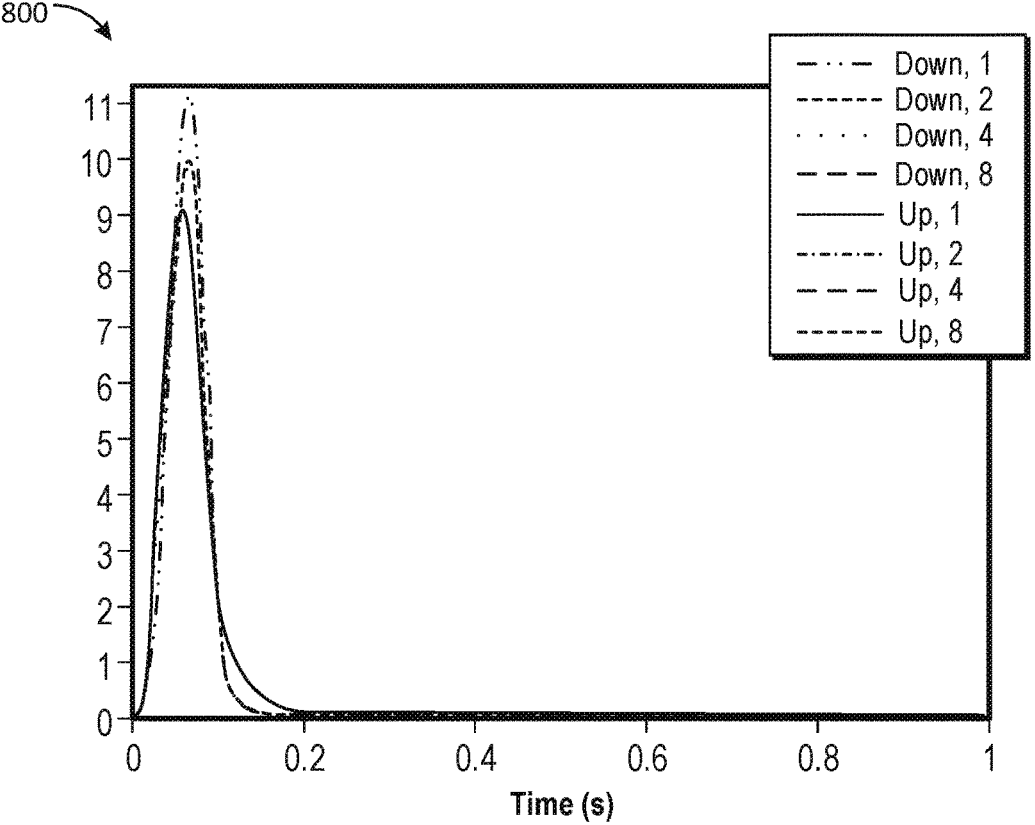
FIG. 8 is a plot showing a velocity of a deformable optical element at various dimple heights and for different directions of actuation, according to an embodiment of the present disclosure.

FIG. 8 shows a plot 800 illustrating a velocity of the deformable element as a function of dimple height and time during actuation. By pre-forming and stretching the deformable element as described above, the height of the dimple can be tuned to modify the transient response in the downward motion to more closely match that of the upward motion. The plot 800 of FIG. 8 demonstrates how non-uniform pre-stress enables tunability of the transient response for an improved user experience.

Introducing temperature-controlled viscoelastic creep in an elastomeric deformable element is an example approach to obtain a non-uniform and customizable pre-stress condition. An elastomer, such as TPU, may be formed and stretched to create a uniformly pre-tensioned deformable element. Through viscoelastic creep induced in the elastomer via tensioning, a residual strain or stress may be introduced to the material. Creep is both stress- and temperature-dependent. Therefore, selective heating with controlled temperature can be applied to induce a non-uniform mechanical strain or stress profile through thermal realization. In some embodiments, conditioning the deformable element after stretching may facilitate customization of the resulting optical lens assembly at a later stage in the manufacturing process. This approach, therefore, facilitates user-specific customization, where the optical lens assembly can be fully assembled and then selectively heated to create a non-uniform strain or stress profile for an inter-pupillary distance or ophthalmic correction specifically tailored to an individual end user, for example.

Figure 9:
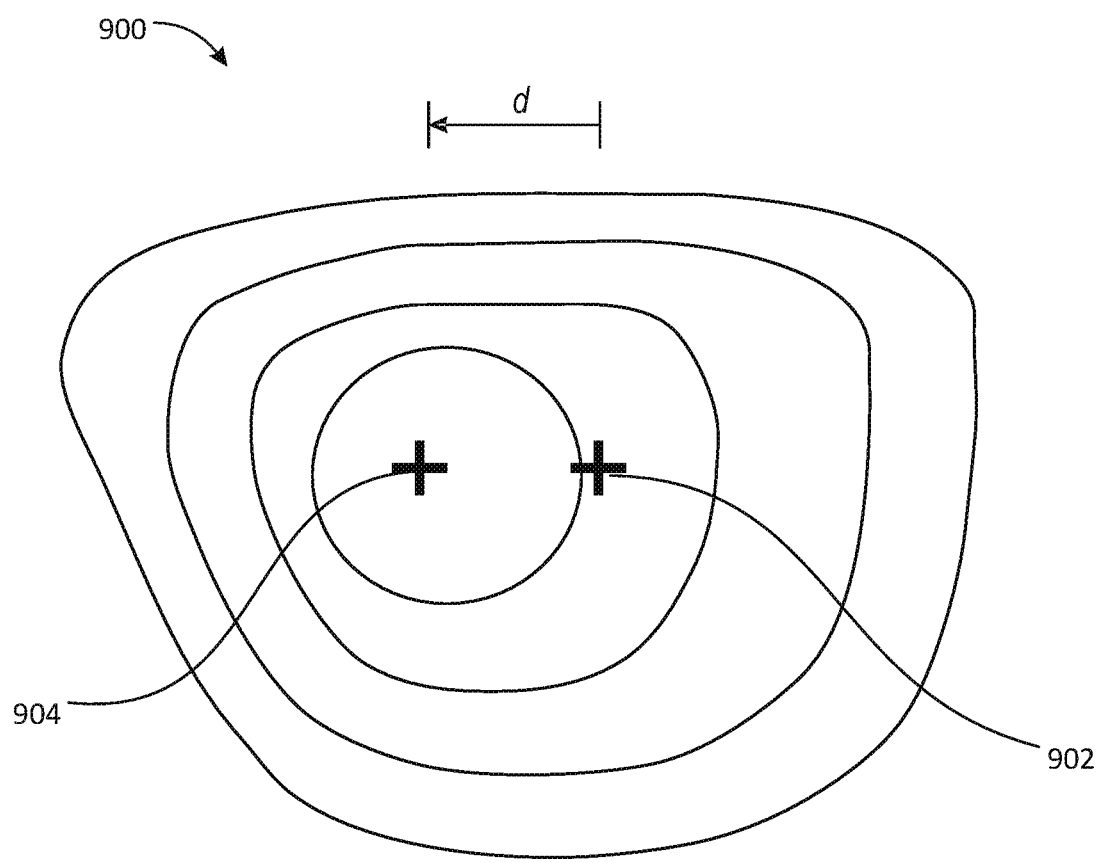
FIG. 9 is a plot illustrating a strain contour of an optical lens assembly according to an embodiment of the present disclosure.

FIG. 9 is a plot 900 qualitatively depicting a strain contour map of an asymmetric optical lens assembly with a location of an optical axis 904 adjusted from a geometric center 902 of the optical lens assembly, such as for adapting to a user's inter-pupillary distance and/or for obtaining an axisymmetric strain near the optical axis 904. The distance d illustrated in the plot 900 of FIG. 9 demonstrates a shift of the optical axis 904 from the geometric center 902 of the optical lens assembly. Accordingly, a desired optical centration location (e.g., a location of an optical axis at a center of the lens curvature) of the optical lens assembly may be achieved by employing embodiments of the present application. In some embodiments, an axisymmetric strain or stress profile may induce a more axisymmetric deformation profile to reduce astigmatic aberrations. Such a strain or stress profile can be introduced through the fabrication processes described in this disclosure, for example.

Figure 10:
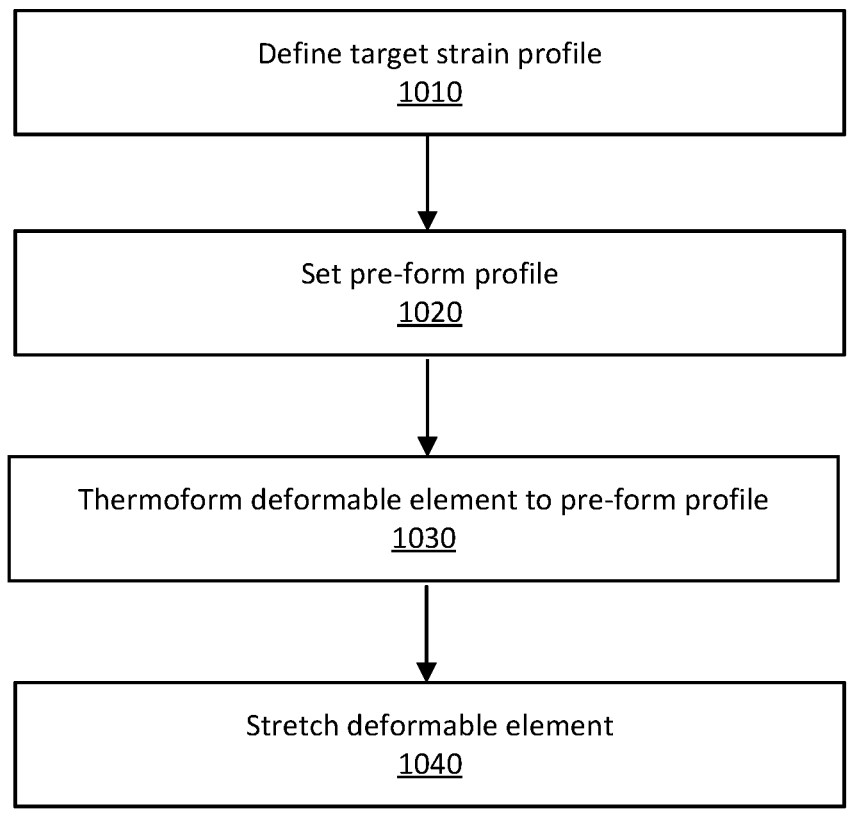
FIGS. 10 and 11 are flow diagrams illustrating methods of fabricating an optical lens assembly according to various embodiments of the present disclosure.

FIG. 10 is a flow chart illustrating a method 1000 of fabricating an optical lens assembly according to embodiments of the present disclosure. In operation 1010, a target strain profile may be defined, such as in consideration of a desired optical axis location, dimple height, optical properties (e.g., accommodative properties, adaptive properties, etc.), shape of the optical lens assembly, inter-pupillary distance, expected gravity sag, etc. The target strain profile may be defined to substantially achieve a desired set of optical properties, such as to tailor the resulting optical lens assembly to a specific user or set of users. By way of example, optical ray tracing and finite element simulations may be used to define the target strain profile for a specific user or for a set of users over a defined accommodative optical power range. In some embodiments, the defined target strain profile may be induced in a deformable element by performing operations 1020, 1030, and 1040, as described below.

In operation 1020, a pre-form profile of the deformable element may be set to substantially achieve the defined target strain profile after further processing. The pre-form profile may be set in consideration of factors such as material properties of the material of the deformable element, thickness of the deformable element, shape of the deformable element, etc. Finite element simulations, possibly including iterative operations and calculations, may be used to determine the pre-form profile to achieve the target strain profile.

In operation 1030, the deformable element may be thermoformed to the pre-form profile. For example, a sheet of polymer material may be positioned on a mold surface having the pre-form profile. The sheet of polymer material may be pre-heated or heated on or in the mold to a sufficient temperature such that the polymer material may substantially form to the shape and contours of the mold surface. The sheet of polymer material may be formed to the shape of the mold surface, and the sheet of polymer material may be cooled to a sufficiently low temperature such that its molded shape is at least semi-permanent. The molded sheet of polymer material may then be removed from the thermoforming mold. If the molded sheet of polymer material is larger than a desired end shape, the sheet of polymer material may be trimmed to the desired end shape.

In operation 1040, the thermoformed deformable element may be stretched. The stretching may be a substantially uniform or non-uniform stretching, depending on the defined target strain profile, material properties of the deformable element, shape of the deformable element, desired optical properties, etc. In some embodiments, the material of the deformable element may be uniaxially stretched. In additional embodiments, the material of the deformable element may be biaxially stretched, such as along two substantially perpendicular axes. In some embodiments, the material of the deformable element may be stretched along at least one axis that is angled from vertical and horizontal relative to an intended orientation of the resulting optical lens assembly when in use. For example, at least some element of the force used to pre-stretch the material of the deformable element may be tangential to an edge of the deformable element. In each of these examples, a pre-tensioning ring may be coupled to the deformable element to substantially maintain the stretched state of the deformable element when not actuated. The resulting pre-stretched deformable element may substantially exhibit the target strain profile defined in operation 1010.

The pre-strained deformable element may then be directly or indirectly coupled (e.g., bonded, adhered, coupled via a separate edge seal material, etc.) to a substantially transparent structural support element (e.g., a substantially planar lens element, a curved lens element, etc.). A substantially transparent deformable medium may be disposed between the deformable element and the structural support element. The structural support element, deformable medium, and deformable element may be coupled to and supported by a housing (e.g., a frame element). An actuator (e.g., an electromechanical actuator, a driver circuit for an electroactive material, etc.) may be coupled to the housing and to the deformable element to actuate and deform the deformable optical element, thus altering an optical property of the optical lens assembly upon actuation.

Figure 11:
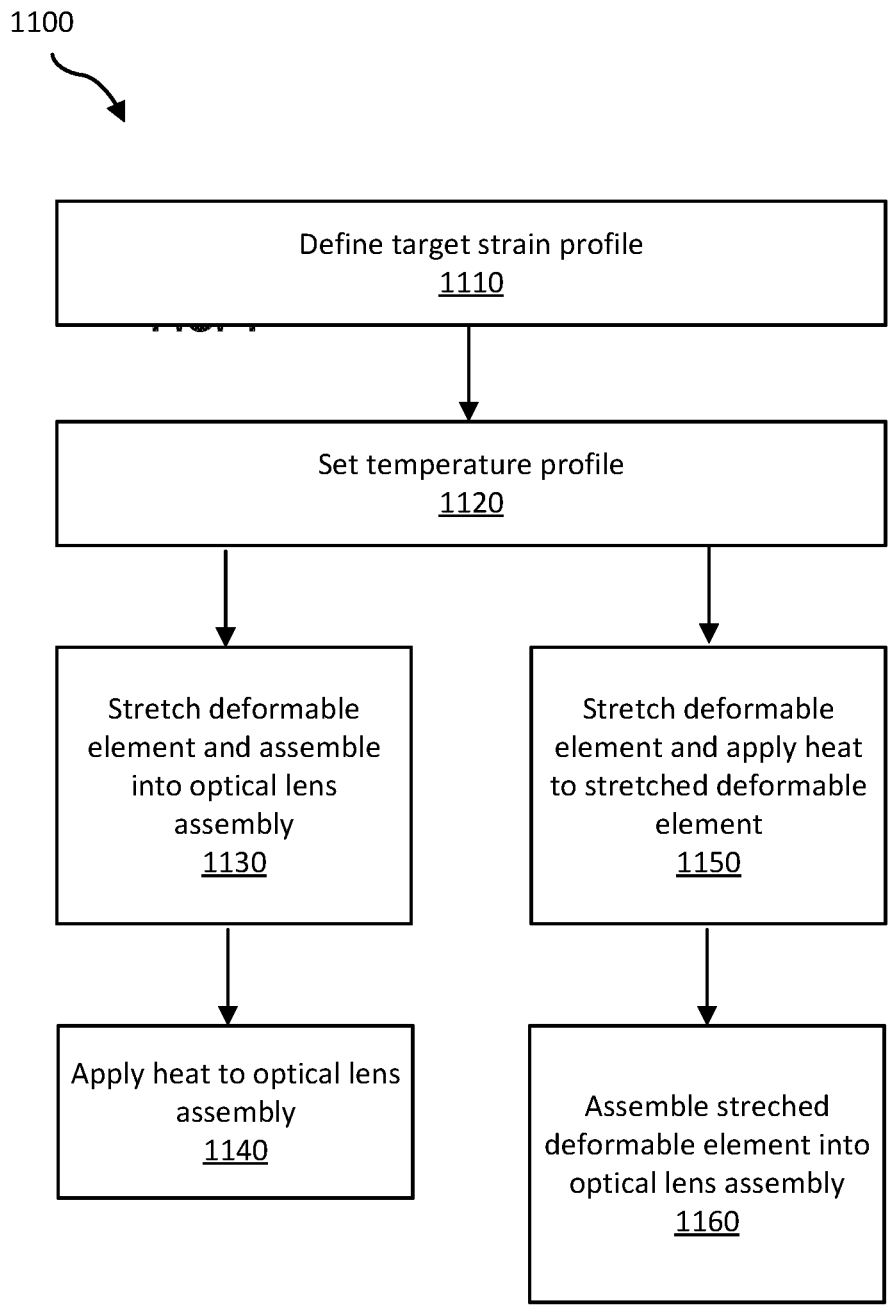

FIG. 11 is a flow chart illustrating a method 1100 of fabricating an optical lens assembly according to additional embodiments of the present disclosure. In operation 1110, a target strain profile of a deformable element may be defined, as discussed above with reference to FIG. 10. In operation 1120, a temperature profile may be set to substantially achieve the defined target strain profile. Application of sufficient heat to the deformable element may induce a residual strain or stress in the deformable element. The temperature profile may include a selective application of heat, such as different amounts of heat and/or for different lengths of time in different regions of the deformable element, to substantially achieve the target strain profile. For example, finite element simulations, possibly including iterative operations and calculations, may be performed to determine the appropriate temperature profile to achieve the target strain profile.

In operation 1130, the deformable element may be stretched, as described above with reference to FIG. 10. The stretched deformable element may be assembled into an optical lens assembly, such as by coupling the deformable element to a pre-tensioning ring, directly or indirectly coupling the deformable element to a structural support element, and disposing a deformable medium in a cavity defined between the deformable element and the structural support element.

In operation 1140, heat may be applied to the optical lens assembly according to the set temperature profile to induce a non-uniform mechanical strain or stress in the deformable element according to the defined target strain profile.

Operations 1150 and 1160 illustrate an alternative (compared to operations 1130 and 1140 described above) sequence for some procedures of fabricating an optical lens assembly. Referring to operation 1150, after the temperature profile is set as indicated in operation 1120, the deformable element may be stretched and heat may be applied to the stretched deformable element according to the set temperature profile.

In operation 1160, the stretched and heat-treated deformable element may be assembled into an optical lens assembly, such as by coupling the deformable element to a pre-tensioning ring, directly or indirectly coupling the deformable element to a structural support element, and disposing a deformable medium in a cavity defined between the deformable element and the structural support element. Thus, the set temperature profile may be applied to the deformable element at various stages of fabricating the optical lens assembly.

In additional embodiments, portions of the material of the deformable element may be selectively polymerized. For example, in polymers that are cured by exposure to actinic radiation (e.g., ultraviolet light, X-rays, etc.), the portions of the deformable element may be selectively exposed to actinic radiation to selectively polymerize those portions (or to induce additional cross-linking compared to portions that are not exposed to the actinic radiation). The selective polymerization may induce a residual strain or stress in the material of the deformable element.

In some embodiments, deformable elements and/or optical lens assemblies having a variety of desired mechanical strain or stress profiles and resulting optical properties may be fabricated according to methods of this disclosure. A deformable element and/or optical lens assembly having a desired set of optical properties may be selected from a group of deformable element and/or optical lens assemblies with respective different mechanical strain or stress profiles and optical properties.

Accordingly, disclosed are optical lens assemblies and associated HMDs that include a deformable element that exhibits a non-uniform mechanical strain and/or mechanical stress profile. Various methods for achieving the non-uniform mechanical strain and/or mechanical stress profile are also disclosed. The disclosed apparatuses and methods may enable improved optical lens assemblies with desirable deformation responses to actuation, at commercially reasonable costs.

Embodiments of the present disclosure may include or be implemented in conjunction with an artificial reality system. Artificial reality is a form of reality that has been adjusted in some manner before presentation to a user, which may include, e.g., VR, AR, mixed reality (MR), hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications, combinations, and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. An optical lens assembly, comprising:
   a pre-strained deformable element that exhibits at least one of a non-uniform mechanical strain or stress profile that is based, at least in part, on an inter-pupillary distance of a user;
   a structural support element coupled to the pre-strained deformable element; andelement;
   a deformable medium positioned between the pre-strained deformable element and the structural support element; and
   a display element positioned adjacent to the pre-strained deformable element, such that the display element is viewable to the user through the pre-strained deformable element.

2. The optical lens assembly of claim 1, wherein the non-uniform mechanical strain or stress profile is a result of a variable pre-tension applied to the pre-strained deformable element.

3. The optical lens assembly of claim 1, wherein the non-uniform mechanical strain profile is a result of residual stress within the pre-strained deformable element.

4. The optical lens assembly of claim 1, wherein the non-uniform mechanical strain profile has a variability of at least about two percent.

5. The optical lens assembly of claim 1, wherein the non-uniform mechanical stress profile has a variability of at least about five percent.

6. The optical lens assembly of claim 1, wherein the optical lens assembly is positioned in a head-mounted display.

7. The optical lens assembly of claim 6, wherein the head-mounted display comprises augmented-reality glasses.

8. The optical lens assembly of claim 1, wherein the non-uniform mechanical strain or stress profile is configured to at least one of:
   correct for at least a portion of a cylindrical error of a user's eye; or
   counter gravity sag in the pre-strained deformable element.

9. The optical lens assembly of claim 1, further comprising a display element positioned proximate to the pre-strained deformable element.

10. A method of fabricating an optical lens assembly, the method comprising:
    inducing at least one of a non-uniform mechanical strain or stress profile in a deformable element, wherein the non-uniform mechanical strain or stress profile is based, at least in part, on an inter-pupillary distance of a user;
    positioning the deformable element over a structural support element;
    disposing a deformable medium between the deformable element and the structural support element; and
    positioning a display element adjacent to the deformable element, such that the display element is viewable by the user through the deformable element.

11. The method of claim 10, wherein inducing the non-uniform mechanical strain or stress profile in the deformable element comprises at least one of:
    conditioning a material of the deformable element; or
    stretching the material of the deformable element.

12. The method of claim 11, wherein conditioning the material of the deformable element comprises thermoforming a polymer to a non-planar profile.

13. The method of claim 11, wherein conditioning the material of the deformable element comprises at least one of:
- selectively exposing portions of the material of the deformable element to heat to induce residual strain or stress in the material of the deformable element; or
- selectively polymerizing portions of the material of the deformable element to induce residual strain or stress in the material of the deformable element.

14. The method of claim 11, wherein stretching the material of the deformable element comprises at least one of:
- uniaxially stretching the material of the deformable element;
- biaxially stretching the material of the deformable element; or
- stretching the material of the deformable element along at least one axis that is angled from vertical and horizontal relative to an intended orientation of the optical lens assembly when in use.

15. A method of fabricating an optical lens assembly for a user, the method comprising:
- providing a deformable element that is substantially transparent;
- inducing at least one of a non-uniform mechanical strain or stress profile in the deformable element, wherein the non-uniform mechanical strain or stress profile of the deformable element is selected based, at least in part, on an inter-pupillary distance of the user;
- positioning the deformable element over a structural support element; and
- positioning a display element adjacent to the deformable element, such that the display element is viewable by the user through the deformable element.

16. The method of claim 15, further comprising disposing a deformable medium between the deformable element and the structural support element.

17. The method of claim 15, further comprising determining the inter-pupillary distance of the user, wherein:
- inducing the non-uniform mechanical strain or stress profile in the deformable element is performed before determining the inter-pupillary distance of the user; and
- providing the deformable element comprises selecting the deformable element with the induced non-uniform mechanical strain or stress profile from a group of deformable elements with respective different mechanical strain or stress profiles.

18. The method of claim 15, wherein positioning the deformable element over a structural support element comprises positioning the deformable element over a substantially transparent structural support element.

19. The method of claim 15, wherein inducing the non-uniform mechanical strain or stress profile in the deformable element comprises at least one of:
- stretching a material of the deformable element;
- thermoforming the material of the deformable element to a non-planar profile; or
- selectively exposing portions of the material of the deformable element to heat to modify residual strain or stress in the material of the deformable element.

\* \* \* \* \*